(12) United States Patent
Kirchner

(10) Patent No.: US 6,361,483 B1
(45) Date of Patent: Mar. 26, 2002

(54) SYSTEM FOR CONTROLLING VIBRATION OF A DYNAMIC SURFACE

(75) Inventor: Edward C. Kirchner, Pittsfield, MA (US)

(73) Assignee: Morrison Berkshire, Inc., North Adams, MA (US)

( * ) Notice: Subject to any disclaimer, the term of this patent is extended or adjusted under 35 U.S.C. 154(b) by 0 days.

(21) Appl. No.: 09/500,111

(22) Filed: Feb. 8, 2000

Related U.S. Application Data

(63) Continuation of application No. 09/425,594, filed on Oct. 22, 1999.

(51) Int. Cl.$^7$ ............................................. B23P 15/00
(52) U.S. Cl. ............................. 492/16; 492/7; 492/20
(58) Field of Search ........................... 492/10, 9, 7, 16, 492/20; 100/99, 153, 176; 73/862.55, 862.68; 72/10.4, 14.4

(56) References Cited

U.S. PATENT DOCUMENTS

| | | | |
|---|---|---|---|
| 3,086,279 A | 4/1963 | Alexeff | 29/123 |
| 3,106,153 A | 10/1963 | Westbrook | 100/155 |
| 3,119,324 A | 1/1964 | Justus | 100/170 |
| 3,389,450 A | 6/1968 | Robertson | 29/116 |
| 3,430,319 A | 3/1969 | Skaugen | 29/116 |
| 3,604,087 A | 9/1971 | Beck | 29/127 |
| 4,062,097 A | 12/1977 | Riihinen | 29/116 |
| 4,301,582 A | 11/1981 | Riihinen | 29/116 |
| 4,357,743 A | 11/1982 | Hefter et al. | 29/116 |
| 4,376,330 A | 3/1983 | Weidinger et al. | 29/116 |
| 4,485,540 A | 12/1984 | Riihinen | 29/116 |
| 4,902,384 A | 2/1990 | Anstotz et al. | 162/252 |
| 5,127,141 A | 7/1992 | Roerig et al. | 29/116.2 |
| 5,197,174 A | 3/1993 | Lehmann | 492/7 |
| 5,290,223 A | 3/1994 | Lehmann | 492/7 |
| 5,386,769 A | 2/1995 | Rinne | 100/93 |
| 5,403,447 A | 4/1995 | Jarvinen et al. | 162/358.1 |
| 5,447,001 A | 9/1995 | Nishimura et al. | 52/167.2 |
| 5,487,715 A | 1/1996 | Schiel | 492/16 |
| 5,520,877 A | 5/1996 | Snelling | 428/36.9 |
| 5,562,027 A | * 10/1996 | Moore | 492/10 |
| 5,592,875 A | * 1/1997 | Moschel | 100/99 |
| 5,685,813 A | * 11/1997 | Kivioja et al. | 492/7 |
| 5,699,729 A | * 12/1997 | Moschel | 100/99 |
| 5,743,839 A | 4/1998 | Niskanen | 492/20 |
| 5,785,636 A | 7/1998 | Bonander et al. | 492/7 |
| 5,813,959 A | 9/1998 | Hader et al. | 492/7 |
| 5,961,899 A | 10/1999 | Rossetti et al. | 264/40.1 |
| 5,965,220 A | * 10/1999 | Schopping | |
| 6,109,285 A | 8/2000 | Kivioja et al. | 137/14 |

* cited by examiner

Primary Examiner—I Cuda-Rosenbaum
(74) Attorney, Agent, or Firm—Lerner, David, Littenberg, Krumholz & Mentlik, LLP

(57) ABSTRACT

A system for controlling vibration of a dynamic surface includes at least one sensor in communication with the dynamic surface for measuring vibration of the dynamic surface and generating a feedback signal proportional to the measured vibration and at least one piezoelectric actuator in communication with the dynamic surface and in communication with the controller for receiving the output signal. The system also includes at least one mass overlying the at least one piezoelectric actuator, whereby the at least one piezoelectric actuator lies between the mass and the dynamic surface, and a controller in communication with the at least one sensor for receiving the feedback signal, generating an output signal in response to the feedback signal and sending the output signal to the at least one piezoelectric actuator. The piezoelectric actuator applies a counter force between the dynamic surface and the mass upon receiving the output signal for reducing or controlling vibration of the dynamic surface.

41 Claims, 14 Drawing Sheets

SYSTEM FOR CONTROLLING VIBRATION OF A DYNAMIC SURFACE

CROSS REFERENCE TO RELATED APPLICATIONS

The present application is a continuation of commonly assigned U.S. patent application Ser. No. 09/425,594 filed Oct. 22, 1999, entitled "System and Method for Controlling Deflection of a Dynamic Surface", the disclosure of which is hereby incorporated by reference herein. The present application claims benefit of U.S. patent application Ser. No. 09/425,594 under 35 U.S.C. §120.

FIELD OF THE INVENTION

The present invention relates to controlling vibration in surfaces and in particular relates to a system for controlling and/or damping vibration of dynamic surfaces.

BACKGROUND OF THE INVENTION

In many industries, such as paper making, food processing, and textiles, or any other industry that processes a web of material, rolls are used for various processing functions, and in many instances, the stability of the roll is very important. For example, in a paper making assembly, roll vibration may cause variations in the thickness of the product being produced. Thus, it is desirable for the rolls to be as stable as possible and devoid of any imperfections, deflections or variations so that the paper being formed will be smooth and uniform. In addition to resulting in the production of inferior products, roll vibration may also result in damage to the roll itself or the machinery containing the roll. Thus, various attempts have been made to control vibration of rolls so as to avoid these problems.

One response to this problem has been to lower the rotational speed of the rolls in order to avoid or correct vibration-induced defects.

U.S. Pat. No. 5,961,899 to Rossetti et al. discloses a vibration control apparatus for processing a calendered medium that controls vibration between two or more rolls by controlling vibration induced thickness variations in a medium exiting from a nip. The apparatus includes a frame, first and second rolls relative to the frame and a force generator, such as an electromechanical active actuator, a servo-hydraulic actuator, a controllable semi-damper, and Active Vibration Absorber (AVA), or an Adaptive Tune Vibration Absorber (ATVA), providing canceling forces to control vibration between the first and second rolls, thereby controlling vibration induced thickness variations in the calendered medium. In certain preferred embodiments, the apparatus includes at least one sensor for providing a signal indicating a vibration condition of at least one of the first and second rolls, and a digital controller for controlling the signal representative of the vibration condition according to a feed-forward-control and providing a control signal to a force generator. Vertical and/or lateral vibration of the rolls may thus be controlled simultaneously. In addition, fundamental vibrational frequencies and their harmonics may be controlled individually, or in combination.

U.S. Pat. No. 5,447,001 to Nishimura et al. discloses a vibration control device for buildings. In one preferred embodiment, a building has mounted on its roof a hollow concrete-steel first mast carried on damping rubber supports. Within the hollow of the first mast, a second mast is mounted on anti-friction rollers, which roll on a low coefficient of friction interior floor of the first mast. The first and second masses are interconnected with a single element to vibrate these masses with a period of vibration that can be synchronized with the vibration period of the building to attenuate building vibration.

U.S. Pat. No. 5,403,447 to Jarvinen et al discloses a system in a press section of a paper machine for monitoring and controlling the running of a press felt. The press felts are guided by rolls having axial directions that are altered by means of an actuator so as to control the running of the press felts. The system includes detector devices for detecting one or more alignment stripes on the felts and oscillation detectors for detecting oscillation of the press rolls. The system also includes a microprocessor base controller for monitoring signals fed to the controller from the detectors. The controller analyzes the detector data in order to detect any felt-induced oscillations. The control system then generates signals for regulating the actuators of the guide roll that guide the running of the felts so that when the oscillation levels of the press rolls rise above certain limits, the direction of the guide roll on the felt that causes the oscillation is turned until an acceptable level of oscillation and/or a level of oscillation is reached.

U.S. Pat. No. 4,902,384 to Anstotz et al. discloses a wet press having vibration control. In one preferred embodiment, a wet press of a papermaking machine includes a pair of rolls defining a roll gap through which the paper being treated passes. The felt is guided in a closed loop path by additional rolls, which include a tightening roll. The tightening roll can be tilted to reduce roll vibrations by tightening the felt to set vibratory marks formed in the felt at an angle relative to the transverse width of the felt and the roll gap. A controllable positioning device is provided which includes a motor operated by a controller to automatically vary the tilt angle in response to sensed vibrations.

Vibration is also a problem when using a wet press of a papermaking machine. In such wet presses, as the felt and paper web to be drained are simultaneously conducted through a roll gap, water is pressed out of the paper web and transferred onto the felt web. The absorbed water is removed from the felt at another point along its closed loop path by, for example, a suction roll. The pairs of rolls forming the roll gap, along with their guides which engaged roll journals and the elastically resilient felt, form a vibrating system with a large number of resonance vibrations that can be excited during operation of the web press.

U.S. Pat. No. 5,785,636 to Bonander discloses a roll having an outer surface made of a fabricated fiber matrix for strengthening and reinforcing the roll to maximize roll stability.

U.S. Pat. No. 4,301,582 to Riihinen discloses a system that removes deflections from a roll using magnetic forces. The roll has a non-rotating axle with ends having a load imposed thereat and a cylindrical shell rotatably supported by bearings on the axle. A magnetic core is formed in the axle and a plurality of pole shoes are spaced from the shell by an air gap. A plurality of electromagnetic windings, each wound on the core at one of the pole shoes, produce a magnetic compensating force field between the shell and the core for responding to deflections in the roll.

U.S. Pat. No. 4,357,743 to Hefter, et al., discloses a controlled deflection roll having a roll shell which is radially movable in at least one plane in relation to a roll support. Position feelers or sensors are arranged at the ends of the roll shell for detecting one or more deflections in the roll shell as a function of deviations from a predetermined reference or set point. The position feelers control regulators operatively associated with pressure or support elements positioned between the roll support and the roll shell so that the roll shell is maintained in the reference or set position.

U.S. Pat. No. 4,062,097 to Riinhinen discloses a roll having magnetic deflection compensation that may be used in the calender or press section of a paper machine. The roll has an inner non-rotating axle and an outer shell surrounding and rotatable with respect to the axle, the axle and the shell having a common axis. The axle includes an inner magnetic structure while the shell includes an outer magnetic structure that rotates together with the shell. These inner and outer magnetic structures cooperate to provide attraction between the shell and axle on one side of the above axis and repulsion between the shell and axle on the opposite side of the axis, thereby achieving deflection control and/or compensation.

Other techniques used to reduce the detrimental effects of roll vibration include running process machinery at slower speeds in order to avoid resonance problems, and using back-up roll systems to reduce vibration.

Therefore, there is a need to have a vibration control system for a dynamic surface that damps or eliminates vibrations in the dynamic surface. There is also a need for a vibration control system that enables vibrations to be induced into a dynamic surface for any purpose necessary.

SUMMARY OF THE INVENTION

The present invention addresses the above-identified problems by providing a system and method for controlling vibration of a dynamic surface. In its broadest sense, the present invention may be used to eliminate undesirable vibrations from a dynamic surface or to actively induce vibrations into the dynamic surface. In preferred embodiments, the present invention may be used to control vibration of a dynamic surface on any object that rotates including, but not limited to, a roll that engages a web, a gear, wheels and/or tires. The present invention may also be used to reduce or control vibrations in aerodynamic surfaces or one or more surfaces of a loom. In highly preferred embodiments, the inventive system includes at least one piezoelectric actuator in communication with the dynamic surface of a roll and a mass overlying the piezoelectric actuator so that the piezoelectric actuator is between the mass and the dynamic surface for controlling vibration of the roll and/or actively inducing vibration into the roll.

As is well known to those skilled in the art, piezoelectric elements may be used to covert electrical energy into mechanical energy and vice versa. For nanopositioning, the precise motion that results when an electric field is applied to a piezoelectric material is of great value. Actuators using this effect have changed the world of precision positioning. As used herein, the term "piezoelectric actuator" means a piezoelectric device or element, or any electronic device that operates in a similar fashion to a piezoelectric element such as an electromagnet or a magnetostatic device.

As set forth herein, the term "dynamic surface" means any surface that may change with respect to time, regardless of whether the change occurs over 5–10 seconds or over a time period as small as one microsecond. However, as microtechnology improves and microprocessors operate at faster speeds, it is contemplated that the present invention could be used for dynamic surfaces that change over a period of time as small as 1 nanosecond. The present invention may be used for a broad range of applications whereby the system components move at various speeds. For example, the vibration control system of the present invention can be used when making a paper web moving at approximately 5000 feet/minute, when making textile materials moving at approximately 100–300 feet/minute or when making paper maker's clothing (PMC) moving at approximately 1–30 feet/minute.

In accordance with one aspect of the present invention, there is provided a system for controlling vibration of a dynamic surface, such as the exterior surface of a roll. The system preferably includes at least one sensor in communication with the dynamic surface for measuring vibration of the dynamic surface and generating a feedback signal upon measuring vibration. The feedback signal may be proportional to the velocity, displacement and/or acceleration of the measured vibration. The feedback signal may consist of one or more of these variables. As used herein, the term "vibration" includes any dynamic surface response to any force to which the dynamic surface may be subjected including pressure forces, compressive forces, tensile forces, resonance, thermal action or other process forces. Moreover, the above-listed vibration forces may be applied in any direction with respect to the dynamic surface including directions that are substantially perpendicular to the dynamic surface and directions that are substantially parallel to the dynamic surface. The system also includes at least one piezoelectric actuator in communication with the dynamic surface and at least one mass overlying the at least one piezoelectric actuator so that the at least piezoelectric actuator lies between the mass and the dynamic surface.

The system also preferably includes a controller in communication with the at least one sensor for receiving the feedback signal and sending the output signal to the at least one piezoelectric actuator. If the feedback signal indicates that the dynamic surface is undergoing vibration, the piezoelectric actuator, upon receiving the output signal, applies a counter force between the dynamic surface and the mass upon receiving the output signal for reducing or controlling vibration of the dynamic surface. The at least one piezoelectric actuator may also be activated when no vibration is sensed in order to actively induce vibrations into the dynamic surface.

The application of piezoelectric elements to dynamic surfaces, such as the exterior surface of a roll, resolves vibration problems in a much more efficient manner than is available with the vibration control methods described above. Piezoelectric actuators can apply forces independently in various magnitudes, and in various combinations. This is not possible with most if not all of the existing roll control methodologies. Piezoelectric actuators are extremely precise, allowing repeatable nanometer and sub-nanometer movements. In addition, piezoelectric actuators can produce significant amounts of force over relatively small areas and are capable of moving heavy loads of up to several tons. Moreover, because piezoelectric elements derive their motion through solid state crystal effects and have no moving parts the response time of piezoelectric elements is in the kilohertz range so that they may be activated at very high frequencies. Finally, piezoelectric elements require very little power and require no maintenance.

The at least one piezoelectric actuator preferably includes a plurality of piezoelectric actuators that are provided in contact with the dynamic surface. The piezoelectric actuators are preferably piezoelectric foils having a length of approximately 1 to 5 centimeters, a width of approximately 1 to 5 centimeters and a height of less than 1 centimeter. As such, one piezoelectric actuator preferably covers an area of approximately 1–25 $cm^2$. In other preferred embodiments, piezoelectric actuators of any size and/or dimension may be used. Thus, the present invention is not limited to using actuators of the size/type listed above.

The present invention preferably applies a plurality of piezoelectric actuators in contact with the dynamic surface of a roll so that relatively large controlling forces may be applied to the dynamic surface. Because each piezoelectric actuator can be controlled separately by the controller, it is possible to impart virtually any type of vibration or shape in the dynamic surface that is desired, thereby providing for unlimited performance possibilities not available in prior art technologies.

In one preferred embodiment, the dynamic surface is preferably provided on a roll shell secured over a roll support. The roll shell may be a non-coated or a coated roll. The roll shell is preferably flexible and substantially cylindrical, has an interior surface defining an inner diameter of the roll shell and an exterior surface defining an outer diameter of the roll shell. The exterior surface of the roll shell preferably includes the dynamic surface. The sensors and piezoelectric actuators are preferably connected to the interior surface of the roll shell; and one or more masses overlie the piezoelectric actuators so that the piezoelectric actuators lie between the masses and the interior surface of the roll shell. In certain embodiments, the ratio of masses to piezoelectric actuators could be 1:1, however, in other embodiments the number of piezoelectric actuators may greatly exceed the number of masses or the number of masses may greatly exceed the number of piezoelectric actuators. In other embodiments, the sensors and piezoelectric actuators may be connected to either the inner or exterior surface of the roll shell or any combination thereof, so long as the masses overlie the piezoelectric actuators so that the piezoelectric actuators lie between the masses and the dynamic surface. In other embodiments, the sensors are in communication with, but not in contact with, the roll shells.

The roll shell preferably has a longitudinal axis and preferably rotates about a central axis substantially parallel to the longitudinal axis. The roll shell is desirably mounted on a roll shell support that supports rotation of the roll shell about the central axis thereof. The roll shell support may include an axle mounted to an external support structure. The axle may rotate.

In certain embodiments, the counter vibrating force applied by the piezoelectric actuators generates either a compressive force or a tensile force between the mass and the dynamic surface of the roll shell. The compressive and tensile forces are applied through the piezoelectric actuators and directly to the dynamic surface and the corresponding mass surfaces. The compressive and tensile forces are generally opposed to one another. In other words, the compressive forces compress the mass and the dynamic surface toward one another while the tensile forces urge the mass and the dynamic surface away from one another. The piezoelectric actuators may be aligned to exert compressive and tensile forces in directions substantially parallel to or substantially perpendicular to the longitudinal axis of the shell. The piezoelectric actuators may also be aligned to apply compressive and tensile forces to the dynamic surface in a plurality of various directions that are neither perpendicular to nor parallel to the longitudinal axis of the shell.

The vibration control system of the present invention preferably includes a plurality of sensors in communication with the shell. The sensors are designed for detecting and/or measuring the magnitude of the vibration of the dynamic surface of the shell. The sensors are preferably spaced apart from one another and interspersed between the piezoelectric actuators. In certain preferred embodiments, the piezoelectric actuators are aligned in rows over the interior surface of the shell and the sensors are interspersed between the piezoelectric actuators. The rows of aligned piezoelectric actuators may extend in directions substantially parallel to or perpendicular to the longitudinal axis of the shell, or may extend in any number of directions between those that are substantially perpendicular and those that are substantially parallel to the longitudinal axis of the shell. The ratio of piezoelectric actuators to sensors is preferably about 100:1. The sensor may be one of a wide variety of sensors including but not limited to a piezoelectric element, a strain gauge, a laser used in conjunction with a reflective element, an optical device, a capacitive device and/or a magnetic device. In other preferred embodiments, the ratio of piezoelectric actuators to sensors will vary. The ratio may be 1:1, or the number of sensors may outnumber the number of piezoelectric actuators.

The vibration control system of the present invention also preferably includes a controller having a microprocessor and a memory device. The memory may have stored therein look-up tables, a control strategy algorithm and/or an adaptive feedback control strategy algorithm. The controller is preferably designed for receiving feedback signals from the sensors. The controller then processes the feedback signals to determine the presence or absence of a vibration. If an undesirable vibration state is detected at one or more regions of the dynamic surface, the controller transmits output signals to the piezoelectric actuators at those vibrating regions for removing the vibrations. The control system of the present invention may also be used to actively induce vibrations into the dynamic surface.

In certain preferred embodiments, the system for controlling vibration of a dynamic surface may be utilized for a web support structure located between two rolls so as to support the web as it passes by the web support structure. In these particular embodiments, the web support structure includes a supporting element having a web support layer. The web support layer has a top surface including the dynamic surface and a bottom surface remote therefrom. The dynamic surface is designed to engage the web passing thereover, such as a web of partially formed paper moving over the dynamic surface during a paper forming process. The control system of the present invention may also be used for processing textile materials and/or paper maker's clothing felts or any other process involving web handling. In these particular embodiments, the sensors and the piezoelectric actuators are provided in contact with the second surface of the web support layer and one or more masses overlie the piezoelectric actuators so that the piezoelectric actuators lie between the second surface of the web and the masses. However, in other embodiments, the sensors and piezoelectric actuators may be in contact with either the first surface or the second surface or any combination thereof, and the masses overlie the piezoelectric actuators. The dynamic surface of the web support layer may be substantially flat or have an arcuate section. In certain embodiments, the one or more sensors preferably determine the position of the dynamic surface in relation to the supporting element for detecting the presence of a deflecting force upon the dynamic surface.

In these embodiments, at least one of the piezoelectric actuators is sandwiched between the at least one mass and the interior surface of the shell. In certain applications, there is a need to operate rolls at a speed that coincides with the resonance of the roll. When operated at or near resonance, a roll's dynamic response may cause detrimental effects on the roll itself, the machinery containing the roll and the process that the roll is completing. Using piezoelectric devices mounted between the roll (or other machine members) and a mass, and having the piezoelectric actuator connected to and controlled by a properly designed control device, vibrations in the dynamic surface of the roll can be reduced and/or controlled, thereby eliminating or reducing detrimental effects. Similarly, vibrations can be induced into rolls or other machine members for any purposes necessary.

DETAILED DESCRIPTION OF PREFERRED EMBODIMENTS

Figure 1A:
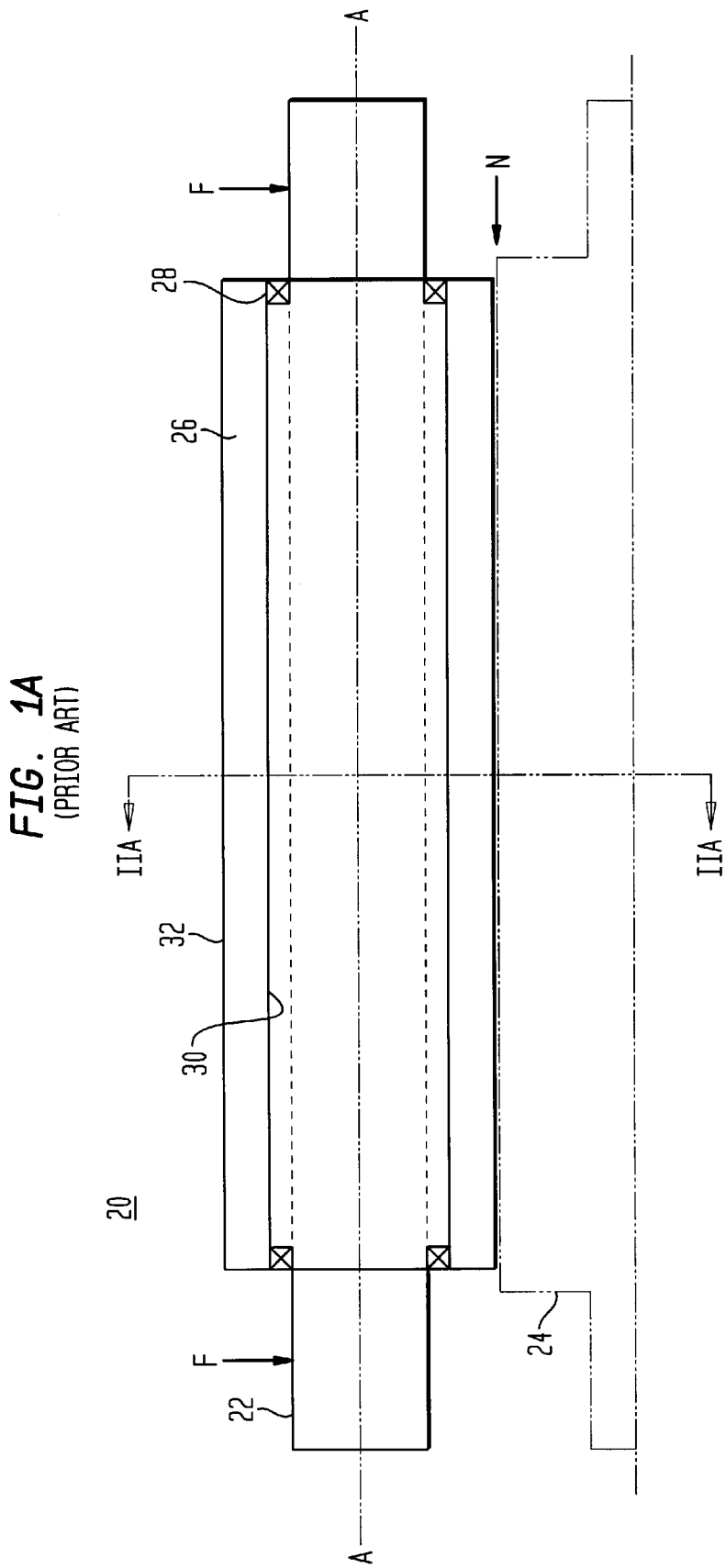
FIG. 1A is a schematic side view of a prior art roll and mating roll engaging a web at a nip.

FIGS. 1A–3B show prior art rolls. Referring to FIG. 1A, the roll 20 is a non-coated roll including an axle 22 loaded at its ends. A non-coated roll generally includes rolls having metal tubes, such as a steel roll or tube. In contrast, a coated roll is understood to be a roll that is coated with a layer of flexible material such as rubber, fabric or cloth. The loading forces F are shown in FIG. 1. The forces F, together with the weight of the roll, provide the required nip pressure at the nip N formed by the interface of roll 20 and a mating roll 24. The forces shown in FIG. 1 and described above are dependent upon the position of the roll 20 relative to the mating roll 24. For example, these forces would change if the roll 20 were under the mating roll 24 (i.e., under the nip). The roll 20 includes a roll shell 26 that is secured about axle 22 via bearings 28. The roll shell has an interior surface 30 and an exterior surface 32. The longitudinal axis or center-line of the axle 22 is indicated by A—A.

Figure 1B:
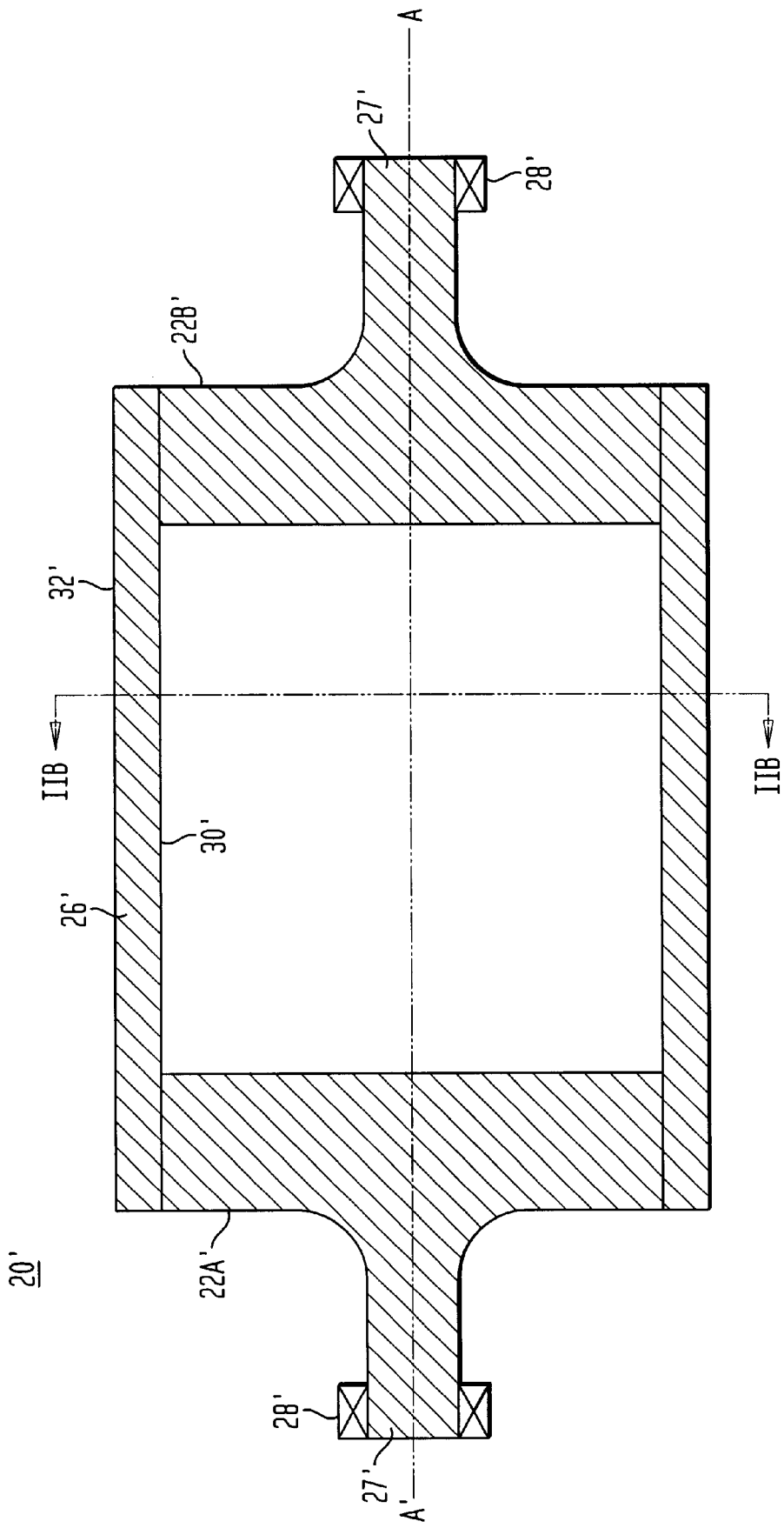
FIG. 1B is a schematic side view of another prior art roll engaging a web.

FIG. 1B shows another prior art non-coated roll 20' that does not have an axle extending therethrough as shown in FIG. 1A. The roll 20' includes a roll shell 26' having an interior surface 30' and an exterior surface 32'. The roll 20' includes supports 22A' and 22B' that support the interior surface 30' of the roll shell 26' as the roll shell rotates about a longitudinal axis A'—A'. The supports 22A' and 22B' includes extensions 27' supported by bearings 28'.

Figure 2A:
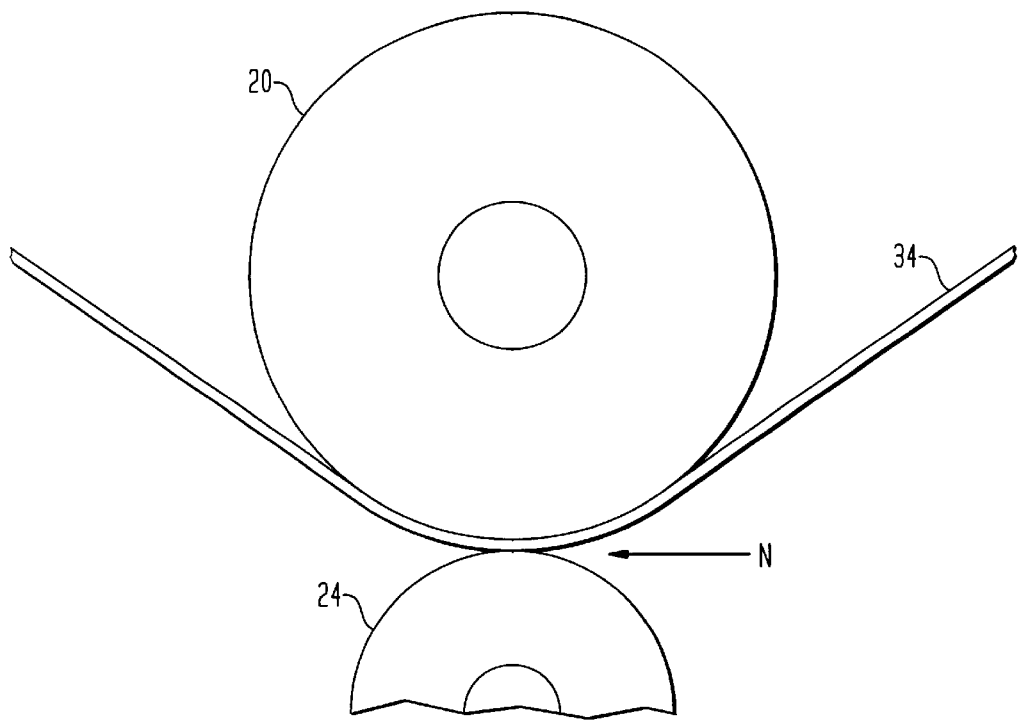
FIG. 2A is a sectional view of the prior art roll of FIG. 1A taken along lines IIA—IIA.

FIG. 2A shows a cross sectional view of the roll 20 and the mating roll 24 of FIG. 1A taken along line IIA—IIA of FIG. 1A. The roll 20 and mating roll 24 are designed for allowing a web 34 to pass therebetween at the nip N. Mating rolls facilitate the development of nip pressures between two rolls, thereby minimizing deflection of one or more rolls. Mating rolls, such as mating roll 24, may also be used as backup or support rolls. The roll 20 and the mating roll 24 may typically be incorporated into any assembly that processes a web of material such as a paper making assembly, a textile making assembly, a paper maker's clothing making assembly, a printing assembly, a metal rolling assembly, an embossing assembly or a calendaring assembly.

Figure 2B:
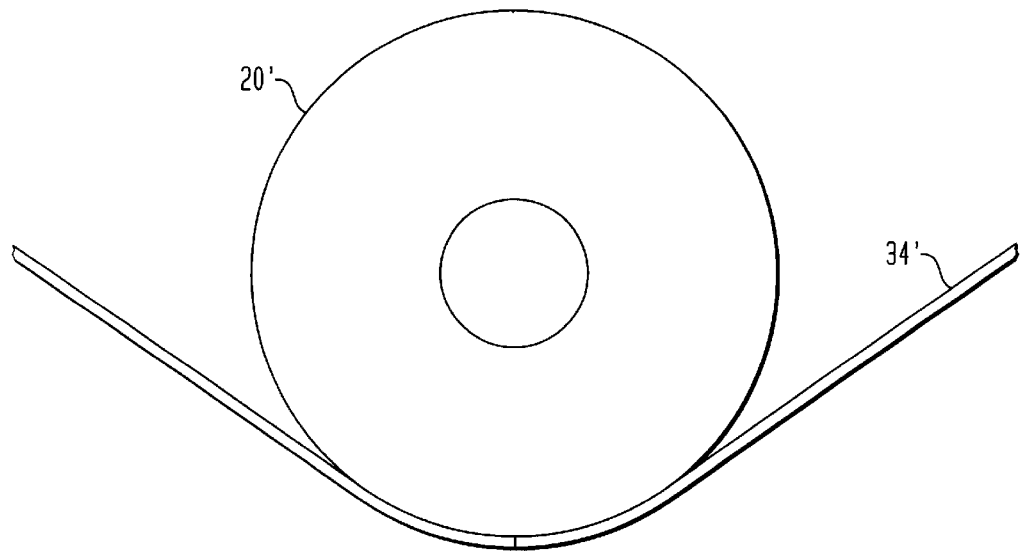
FIG. 2B is a sectional view of the prior art roll of FIG. 1B taken along lines IIB—IIB.

FIG. 2B shows a cross-sectional view of the roll 20' of FIG. 1B taken along line IIB—IIB of FIG. 1B. The roll 20' of FIG. 2B is a singular roll that is not in contact with a mating roll for creating nip pressure.

Figure 3A:
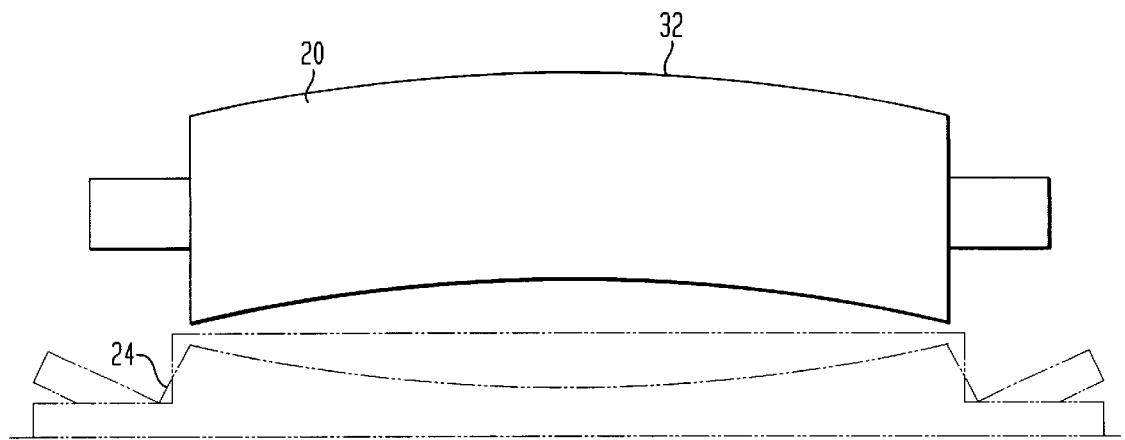
FIG. 3A shows a simplified view of the prior art roll of FIG. 1A during rotation of the roll.
Figure 3B:
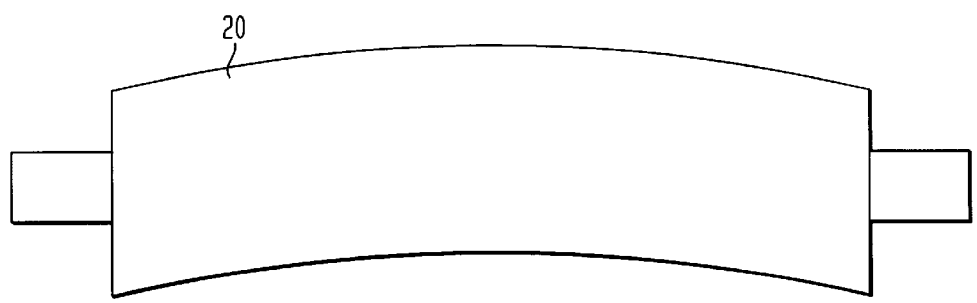
FIG. 3B shows a simplified view of the prior art roll of FIG. 1B during operation of the roll.

FIG. 3A shows a simplified view of the roll 20 of FIGS. 1A and 2A when the roll is vibrating. The mating roll 24 may also vibrate as indicated by the dashed lines. The vibration of the roll 20 may be the result of vibrating forces applied to the exterior surface 32 of the roll by a web (not shown), or by the resonance frequencies of the rolls or other exciting energies such as vibrational energy transmitted from any other part of a machine that causes a roll to go into resonance or drives a roll into a vibrating state. FIG. 3B shows a simplified view of the roll 20 of FIGS. 1B and 2B when the roll is vibrating. The roll vibration shown in FIGS. 3A and 3B can have detrimental effects on the rolls, the machinery containing the rolls or the products being produced using the rolls. The present invention is directed towards a control system that both detects roll vibration anywhere on a roll and actively corrects the condition for rapidly and efficiently returning the roll to a non-vibrating state. In certain embodiments, it may be preferable to detect and/or correct roll vibration only at the portion of the roll at the nip. To a broader extent, the present invention is directed toward providing a control system for a dynamic surface for detecting the occurrence of a vibration in a dynamic surface, measuring the velocity, acceleration or displacement of the vibration, and then operating actuators to return the dynamic surface to a non-vibrating condition.

Figure 4A:
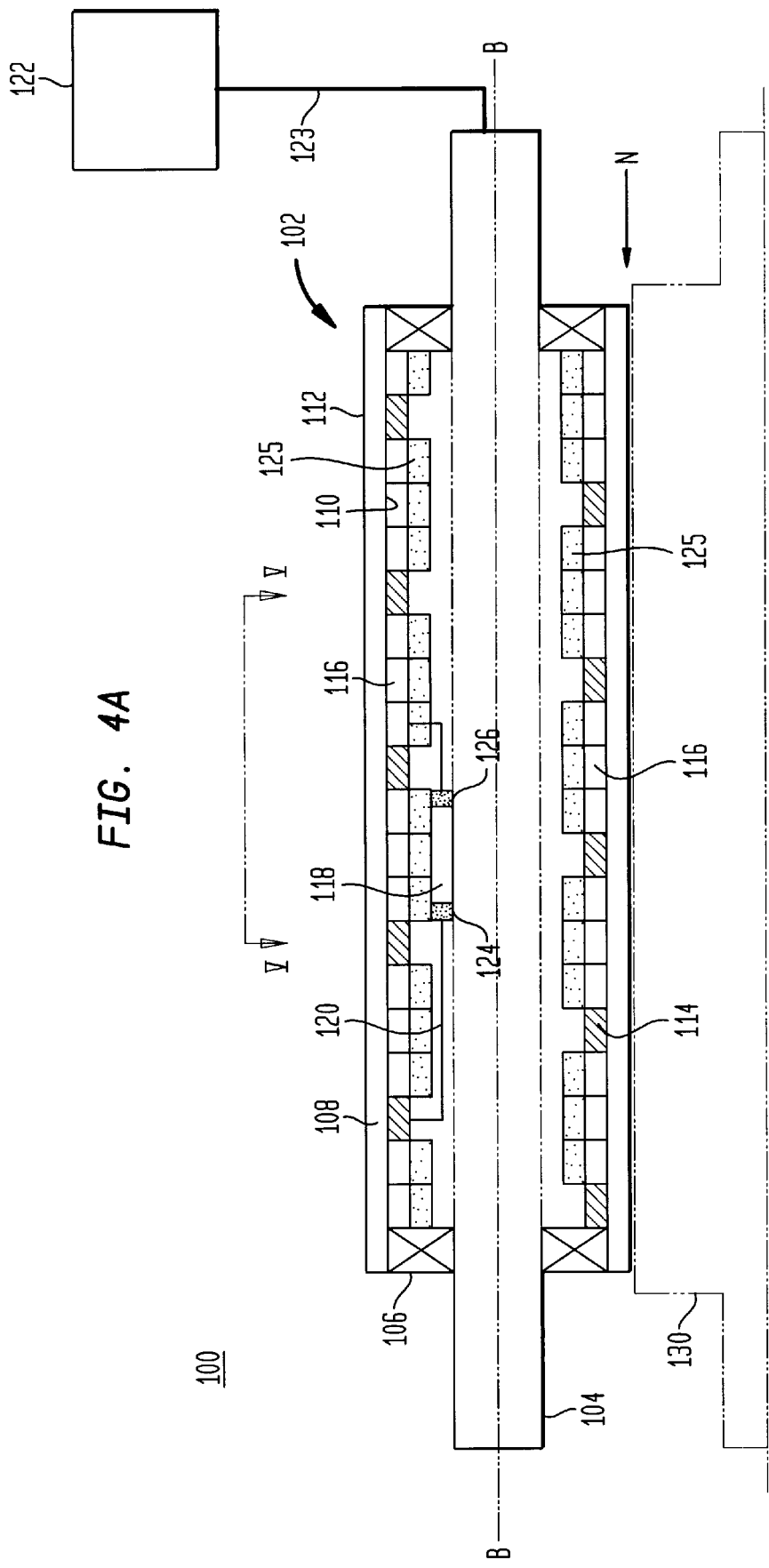
FIG. 4A is a schematic cross-sectional view of a roll including a system for controlling vibration of the roll, in accordance with certain preferred embodiments of the present invention.

FIG. 4A shows a deflection control system 100 for a roll 102 in accordance with certain preferred embodiments of the present invention. The roll 102 includes an axle 104 having bearings 106 for supporting a roll shell 108. The roll shown in FIG. 4A is commonly referred to as a non-coated roll. A non-coated roll is typically made by providing a roll shell, such as a solid steel shell, that supplies the main support for the roll. The roll shell 108 has a longitudinal axis that is substantially parallel to the longitudinal axis B—B of axle 104. The roll shell 108 is generally cylindrical or tubular and includes an inner surface 110 defining an inner diameter and an exterior surface 112 defining an outer diameter. The outer diameter is (O.D.) of the roll 102 is defined by the exterior surface 112 of roll shell 108.

The vibration control system also includes a plurality of sensors 114 and a plurality of piezoelectric actuators 116 connected to the interior surface 110 of the roll shell 108. The sensors 114 and piezoelectric actuators 116 are in signal sending and receiving communication with a controller 118 via conductive traces 120 extending between the sensors 114 and piezoelectric actuators 116, and the controller 118. For clarity of illustration, FIG. 4A shows only one sensor 114 and one piezoelectric actuator 116 connected to controller 118, however, it should be understood that all of the sensors and actuators are preferably in signal sending and receiving communication with the controller. The control system also includes a mass 125 overlying each piezoelectric actuator 116. As a result, each piezoelectric actuator is positioned between the inner surface 110 of the roll shell 108 and one of the masses 125 overlying the piezoelectric actuators.

In the particular embodiment shown in FIG. 4A, the controller 118 is located within the roll 102 for rotating simultaneously with the roll, the sensors 114, the piezoelectric actuators 116 and the masses 125. Power for the controller may be provided from a stationary power source 122 through a power line 123 that extends through axle 104. The energy is transmitted from the stationary power source to the rotating controller via a connection mechanism, such as a slip ring, that will not twist the power line 123 as the roll rotates. The controller 118 preferably includes a microprocessor 124 and a memory device 126 for storing a deflection control strategy or data related to preferred operating conditions for the roll 102 and roll shell 108. The controller 118 preferably uses one or more software applications stored therein, the software applications being capable of receiving feedback signals from the sensors 114, comparing the feedback signals with data stored in the memory device 126 and generating a series of output signals for transmission to the piezoelectric actuators 116. Upon receiving the output signals, the piezoelectric actuators are actuated for drawing the masses and the dynamic surface toward one another or forcing the masses and the dynamic surface away from one another so as to remove vibrations from the roll shell 108, as will be described in more detail below.

In operation, a moving web (not shown) passes through a nip N created by roll 102 and mating roll 130. The roll 102 and mating roll 130 are shown in a generally horizontal orientation, however, the vibration control system of the present invention is also intended for use when the rolls 102, 130 have a substantially vertical orientation or any other geometric orientation with respect to the ground or one another. For clarity of illustration, FIG. 4A shows two rolls: roll 102 and mating roll 130. However, the present invention may also be used for controlling vibrations in systems having three or more rolls in contact with one another including a calendar stack of rolls whereby at least one of the rolls in the stack has two or more nip surfaces.

Figure 4B:
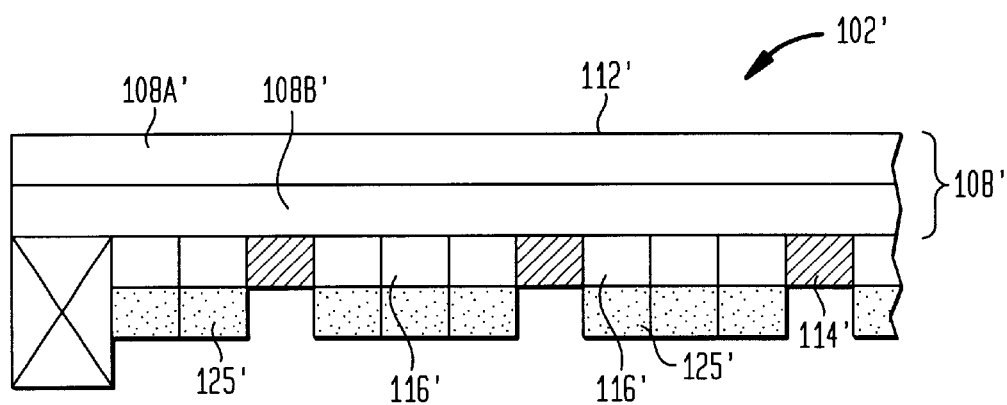
FIG. 4B is a fragmentary schematic cross-sectional view of a roll, in accordance with further preferred embodiments of the present invention.

FIG. 4B shows a fragmentary view of a roll having a vibration control system in accordance with further preferred embodiments of the present invention. The FIG. 4B embodiment is substantially similar to the embodiment shown in FIG. 4A, however, the FIG. 4B embodiment includes a coated roll 102' having a roll shell 108'. The roll shell 108' includes a flexible coating 108A' overlying a structural support member 108B'. The flexible coating preferably includes a flexible material such as an elastomer (e.g. rubber) or cloth. When the flexible material is an elastomer, the structural support member 108B' is preferably a solid tube, such as a steel tube. The outer diameter of the coated roll 102' is defined by the exterior surface 112' of the flexible coating 108A'. The system includes a plurality of piezoelectric actuators 116' and sensors 114' overlying the inner surface 110' of the roll shell 108B' and masses 125' overlying the piezoelectric actuators.

Figure 4C:
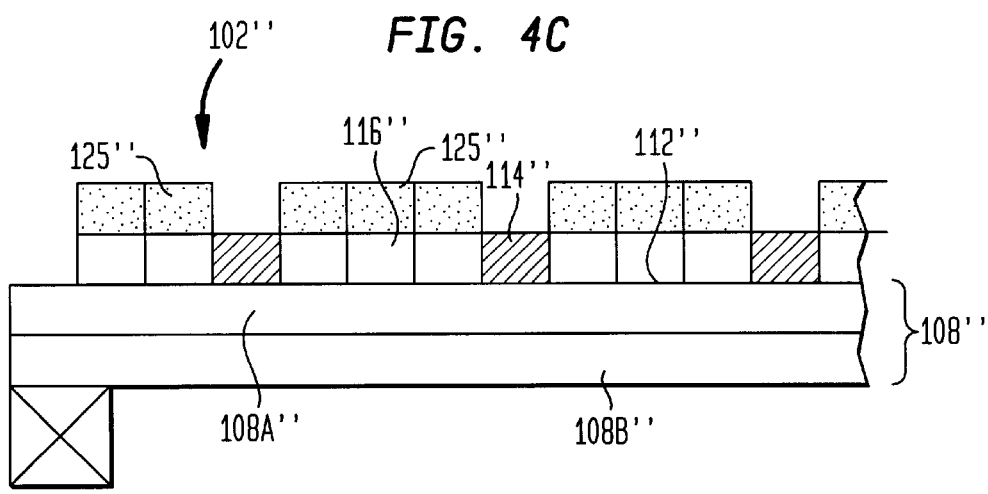
FIG. 4C is a fragmentary schematic cross-sectional view of a roll, in accordance with still further preferred embodiments of the present invention.

FIG. 4C shows another embodiment of the present invention having the sensors 114" and piezoelectric actuators 116" on the outer diameter 112" of the roll 102". The roll 102" is a coated roll including a roll shell 108" including a flexible coating 108A" overlying a structural support member 108B". The sensors 114" and piezoelectric actuators 116" are on the exterior surface 112" of the flexible coating 108A". Masses 125" are provided over the piezoelectric actuators 116" so that the piezoelectric actuators 116" are sandwiched between the exterior surface 112" of the flexible coating 108A" and the masses 125". In further embodiments, the roll may be a non-coated roll and the sensors, actuators and masses are provided on the exterior surface of the roll shell (i.e., the exterior surface of the structural support member).

Figure 4D:
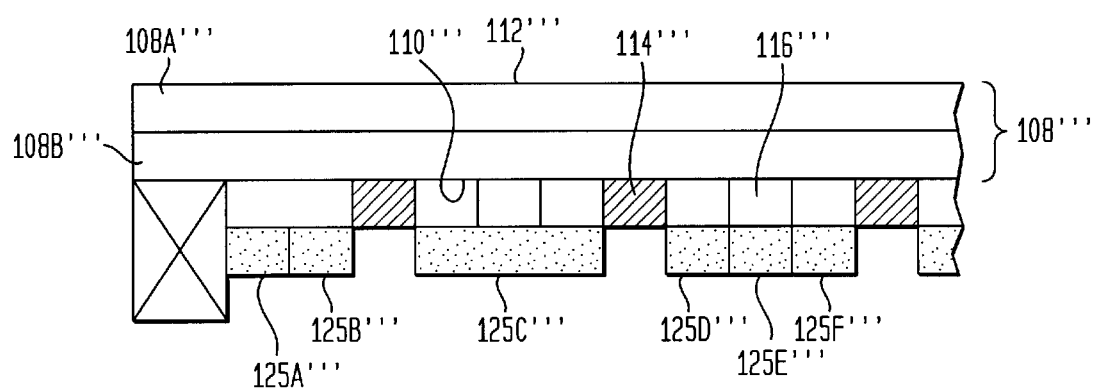
FIG. 4D is a fragmentary schematic cross-sectional view of a roll, in accordance with yet further preferred embodiments of the present invention.

FIG. 4D shows a fragmentary view of a roll having a vibration control system in accordance with further preferred embodiments of the present invention. In FIG. 4D the ratio of masses 125''' to piezoelectric actuators 116''' may be 1:1, or the number of masses 125''' may exceed or be less than the number of piezoelectric actuators 116'''. The left side of the roll has two masses 125A''' and 125B''' overlying one piezoelectric actuator. In the center of the roll, one mass 125C''' overlies three piezoelectric actuators. On the right side of the roll, the ratio of masses to actuators is 1:1 as three masses 125D''', 125E''' and 125F''' overlie three separate piezoelectric actuators.

Although the present specification provides a detailed description of the vibration control system of the present invention when describing the roll 102 embodiment shown in FIG. 4A, the present invention is equally applicable to the coated roll 102' embodiment shown in FIG. 4B, the roll 102" embodiment shown in FIG. 4C, or any other type of dynamic surface.

Figure 5:
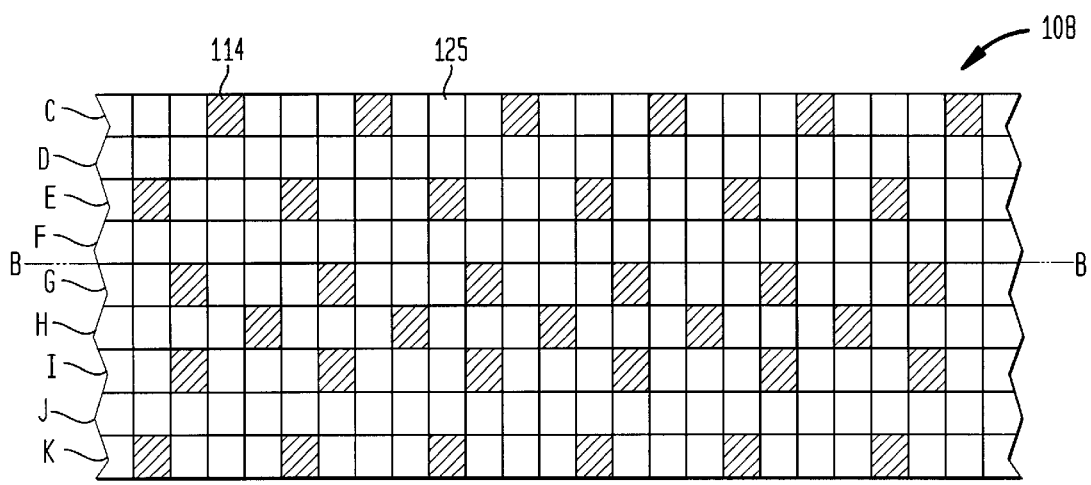
FIG. 5 is a fragmentary view of a the roll of FIG. 4A taken along lines V—V including a plurality of sensors in contact with the dynamic surface of the roll and a plurality of masses overlying piezoelectric actuators, in accordance with certain preferred embodiments of the present invention.

FIG. 5 shows a fragmentary view of FIG. 4A, taken along lines V—V, showing sensors 114 and masses 125/ piezoelectric actuators 116 connected to the inner surface 110 of the roll shell 108. The masses 125 overlie the piezoelectric actuators which are not shown. The piezoelectric actuators and the masses overlying the piezoelectric actuators are preferably aligned in rows C, D, E, F, G, H and I that extend substantially parallel to the longitudinal axis B—B of the roll shell 108. Each mass is preferably in registration with one of the piezoelectric actuators. Each mass 125 preferably has a length of approximately 1 to 5 centimeters, a width of approximately 1 to 5 centimeters, and a height of less than one centimeter. Thus, each mass 125 generally covers an area of approximately 1–25 cm$^2$. The piezoelectric actuators generally cover the same area as the masses. The sensors 114 are interspersed between the masses 125 and are preferably spaced so that the controller is able to monitor the entire dynamic surface of the roll. As mentioned above, the sensors are designed for detecting the presence of vibration of the dynamic surface of the roll shell 108.

The number of piezoelectric actuators 116 and masses 125 generally outnumber the number of sensors 114 by a significant amount. In one preferred embodiment, the ratio of masses and piezoelectric actuators to sensors is approximately 100:1. Preferred sensors include piezoelectric elements, strain gauges, a laser and reflective element subassembly, an optical device, a capacitive device, and/or a magnetic device. In the preferred embodiment shown in FIGS. 4A and 5, the sensors are piezoelectric elements capable of detecting a vibration of the dynamic surface of the roll. Such vibration will strain the piezoelectric sensor to stretch or compress. The piezoelectric sensor will then transform the physical movement into an electric feedback signal, whereby the magnitude of the electric feedback signal may be proportional to the magnitude of the physical movement of the sensor. The electric feedback signal is sent to the controller. The electric signal may be either an electric voltage signal or a current signal.

Figure 6:
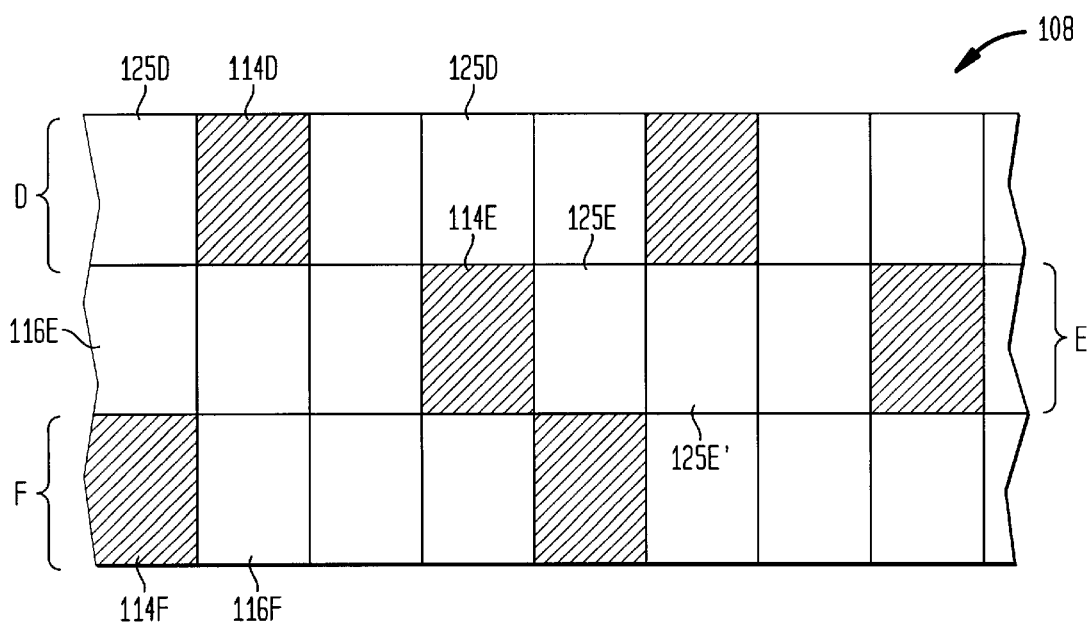
FIG. 6 shows a fragmentary view, on an enlarged scale, of the dynamic surface of the roll shown in FIG. 5.

FIG. 6 shows an enlarged fragmentary view of rows D, E and F of FIG. 5. Each row includes masses 125 overlying piezoelectric actuators (not shown) with sensors 114 interspersed between the masses and piezoelectric actuators. The sensors 114 preferably monitor a specific region of the roll shell 108 to detect whether that region is subjected to vibration. Each sensor 114 operates independently of the other sensors. For example, sensor 114 F in row F may detect a vibration while sensor 114E of row E detects no vibration. The piezoelectric actuators may also operate independently of one another. For example, piezoelectric actuator 116F may apply a counter vibrating force to the roll shell while piezoelectric actuator 116E is not actuated and applies no counter vibrating force to the roll shell. Moreover, piezoelectric actuators adjacent one another may apply counter vibrating forces having different magnitudes; e.g. the piezoelectric actuator underlying mass 125E applies a counter vibrating force having a greater magnitude that the force applied by the piezoelectric actuator underlying mass 125E'. The actual magnitude of the counter vibrating force applied by any one piezoelectric actuator is typically proportional to the magnitude of the electric signal received from the controller 118 (FIG. 4). Although the masses 125 and the actuators 116 underlying the masses are depicted in rows, the present invention includes embodiments where the masses and actuators are arranged randomly or in a pattern. The sensors 114 may also be arranged in a pattern or randomly.

Referring to FIGS. 4A and 6, during operation or rotation of the roll 102, the region of the roll shell 108 overlying row D may be in contact with a moving web while regions of the roll shell overlying rows E and F are not in contact with the web. As a result, the moving web vibrates the roll shell overlying row D while rows E and F are not vibrating. Thus, the sensors 114D in row D will detect vibration while the sensors 114E and 114F of respective rows E and F will not detect vibration. In response, output signals sent from the controller to piezoelectric actuators of row D will physically move those piezoelectric actuators for damping vibration of the dynamic surface of the roll shell 108 overlying actuators 116D. However, no output signals will be sent to the piezoelectric actuators 116E and 116F in rows E and F. As such, piezoelectric actuators will only be activated by output signals when necessary to control and/or damp vibration of the roll shell or when it is desirable to actively vibrate the dynamic surface of the roll shell. The force applied by each actuator in any one row may vary. For example, the actuators in the center of a row may apply more force than the actuators adjacent a journal. In addition, in any one row, the actuators adjacent one journal may provide more force than the actuators adjacent an opposed journal.

Figure 7:
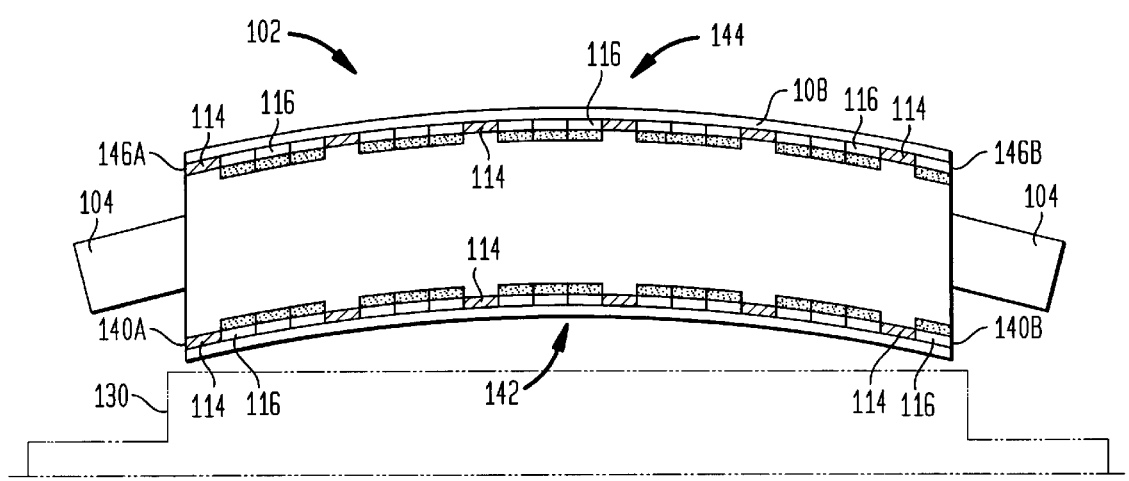
FIG. 7 shows the roll shown in FIG. 4A during operation of the roll.

FIGS. 7 and 8 show the roll 102 of FIG. 4A before activation of the vibration control system of the present invention. During operation of the roll, a web 128 (not shown in FIG. 7) passes between the roll 102 and mating roll 130. The rotational speed of the roll 102 is dependent upon a number of factors including the speed of the web passing between roll 102 and mating roll 130 and the outer diameter of the roll. Referring to FIG. 8, in response to a number of vibrating forces, including the high rate of rotation of the roll (e.g., 5000 revolutions/minute) web tension, nip pressure and gravity, the roll 102 and the roll shell 108 vibrate. As set forth above, vibration of the roll is undesirable because it will have an adverse effect on the material 128 (e.g., a web) passing between the roll 102 and the mating roll 130.

Referring to FIG. 7, during operation the sensors 114 are activated for detecting vibration of the dynamic surface of the roll 102 and to send feedback signals back to the controller (FIG. 4) upon sensing vibration. Upon receiving feedback signals from the sensors, the controller will determine the magnitude of the vibration. The controller will then calculate output signals to be sent to each of the piezoelectric actuators 116 connected to the roll shell. The magnitude of the output signals sent to the individual piezoelectric actuators may vary because the amount of damping force or attenuating force required at each particular region of the roll may vary. Upon receiving the output signals from the controller, the piezoelectric actuators 116 will exert tensile and/or compressions forces on the dynamic surface of the roll for damping and/or controlling vibration of the dynamic surface. In certain embodiments, one or more piezoelectric actuators may saturate or "max out"; i.e. a condition where the piezoelectric actuator is exerting a maximum force and this maximum force is not enough to completely damp or control a localized vibration in the dynamic surface. In these instances, piezoelectric actuators located outside the area of the vibration may be actuated to assist the "maxed out" piezoelectric actuators.

Figure 8A:
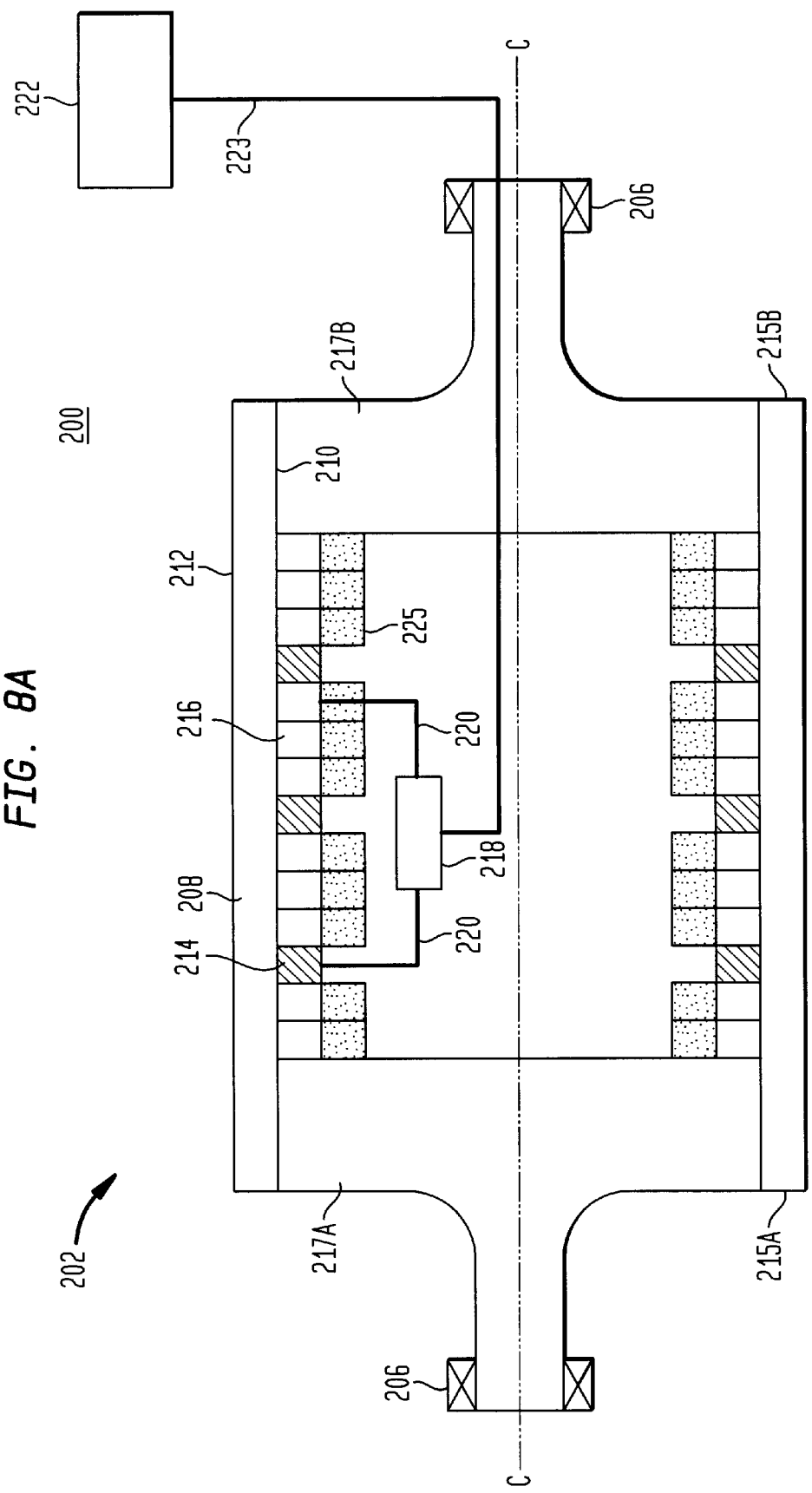
FIG. 8A is a schematic cross-sectional view of a non-coated roll including a system for controlling vibration of the roll, in accordance with further preferred embodiments of the present invention.

FIG. 8A shows a vibration control system 200 for a non-coated roll 202 in accordance with further preferred embodiments of the present invention. The roll 202 includes a roll shell 208 having first and second ends 215A and 215B. The system includes first and second supports 217A and 217B for supporting the first and second ends 215A and 215B of the roll shell 208. The supports 217A and 217B are connected with the interior surface 210 of the roll shell 208 for supporting rotation of the roll 202. The supports 217A and 217B extend beyond the ends 215A and 215B of the roll shell 208 to bearings 206 so that the roll 202 may rotate about longitudinal axis C—C. The roll 202 includes a controller 218 for controlling vibration of the roll shell 208. The controller 218 is in communication with sensors 214 and piezoelectric actuators 216 via traces 220. FIG. 8A shows only one sensor 214 and one piezoelectric actuator 216 connected to controller 218, however, it should be understood that all of the sensors and actuators are preferably in signal sending and receiving communication with the controller. Masses 225 overlie the piezoelectric actuators 216 so that the piezoelectric actuators 216 lie between the inner surface 210 of the roll shell 208 and the masses 225. The controller 218 is preferably located within roll shell 208 for rotating simultaneously with the roll shell, the sensors 214 and the piezoelectric actuators 216. Power for the controller 218 may be provided from a power source 222 through a power line 223 that extends through one of the structural members 217. The controller 118 operates in a manner that is substantially similar to that described above in regards to FIG. 4A.

Figure 8B:
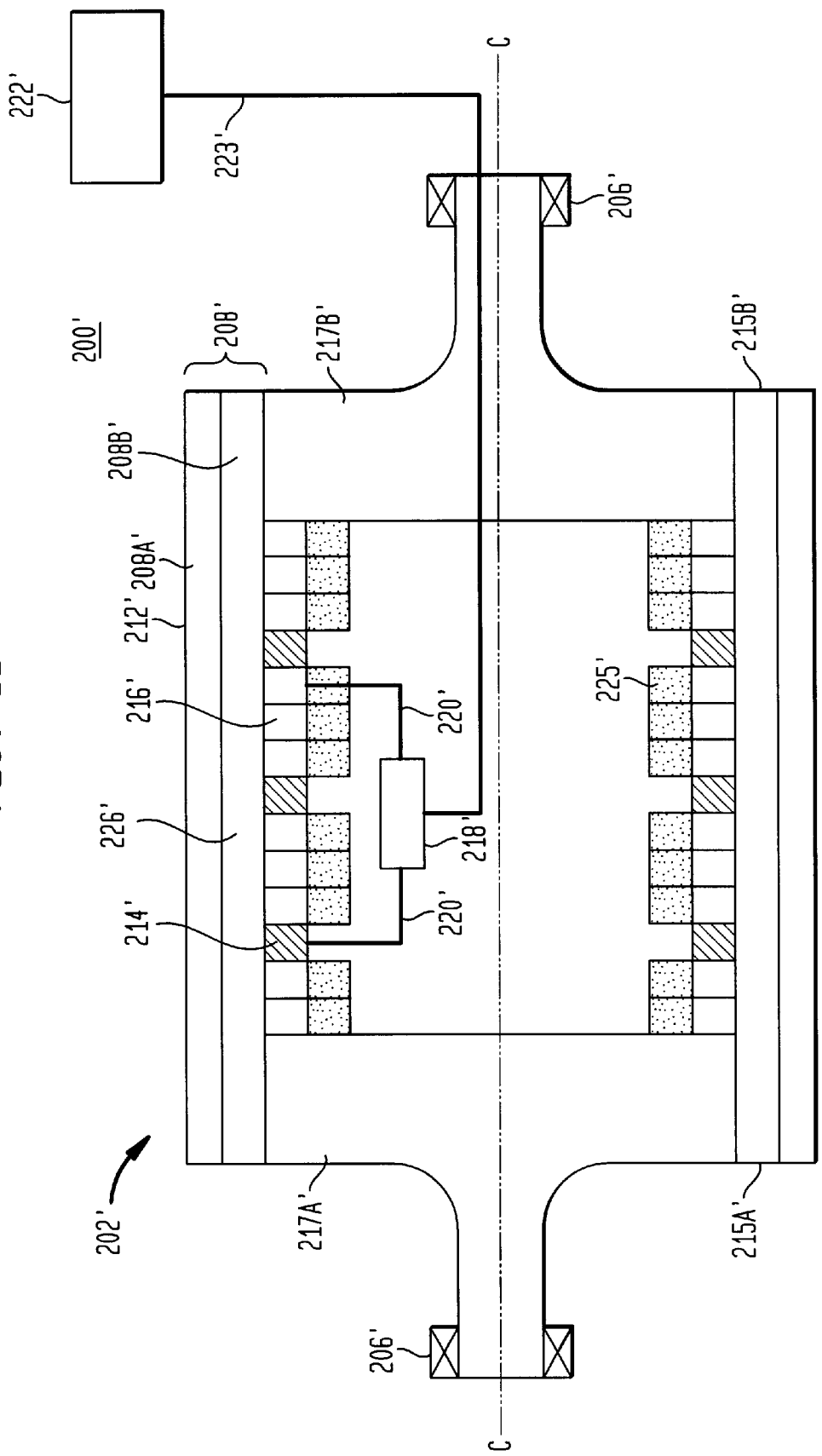
FIG. 8B is a schematic side view of a coated roll including a system for controlling vibration of the roll, in accordance with still further preferred embodiments of the present invention.

FIG. 8B shows another embodiment of the present invention that is substantially similar to the FIG. 8A embodiment, however, the FIG. 8B embodiment includes a coated roll 202'. The coated roll 202' includes a roll shell 208' having a flexible coating 208A' surrounding structural support member 208B'. The outer diameter of the coated roll 202' is defined by the exterior surface 212' of the flexible coating 208A'. Both the non-coated roll 202 of FIG. 8A and the coated roll 202' of FIG. 8B are dynamically flexible and include dynamic surfaces as that term is defined herein. As a result, the non-coated and coated rolls disclosed herein may deflect and/or vibrate during operation.

Figure 9:
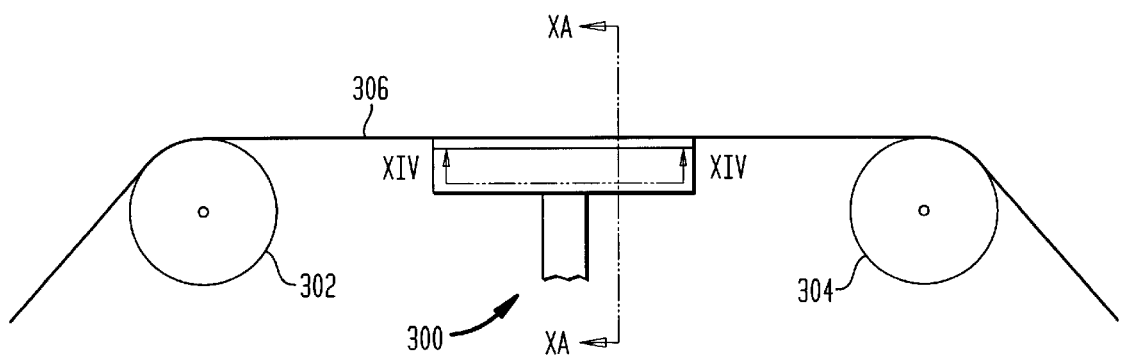
FIG. 9 shows a schematic side view of a system for controlling vibration of a dynamic surface, in accordance with further preferred embodiments of the present invention.
Figure 10A:
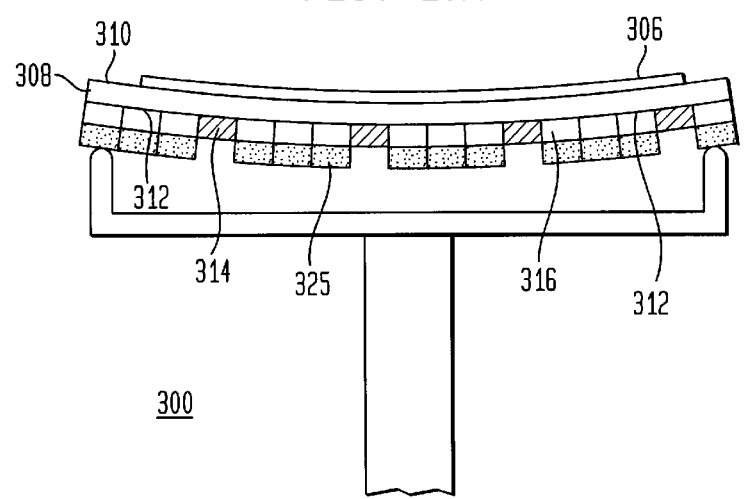
FIG. 10A is a sectional view taken along lines X—X of FIG. 9, showing the dynamic surface of a web support layer.

FIGS. 9 and 10A show a deflection control system in accordance with further preferred embodiments of the present invention. Referring to FIG. 9, a web support element 300 is provided between two rolls 302 and 304. The web support element 300 supports a web 306 moving between first roll 302 and second roll 304. Referring to FIG. 10A, the web support element 300 includes a web support layer 308 having a first surface 310 for engaging the web 306 and a second surface 312 remote therefrom. The second surface 312 of the web support layer 308 includes sensors 314 and piezoelectric actuators 316 connected thereto. Masses 325 overlie the piezoelectric actuators for damping vibrational forces on the web support layer 308.

Figure 10B:
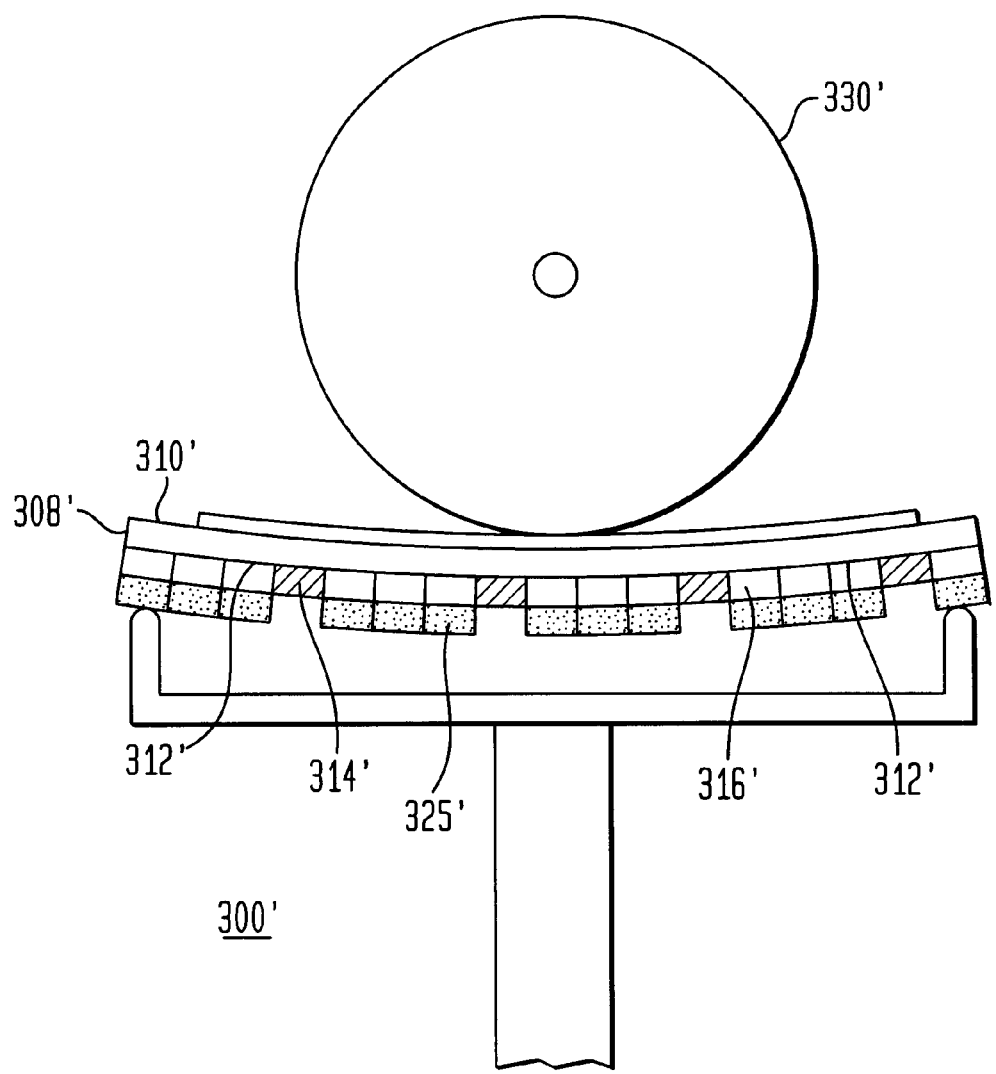
FIG. 10B shows a sectional view of a system for controlling deflection of a dynamic surface including a mating roll for creating nip pressure, in accordance with further preferred embodiments of the present invention.

FIG. 10B shows another embodiment, similar to the embodiment of FIG. 10A, including a mating roll 330', whereby a web 306' passes between the mating roll and the web support layer 308'.

Although the invention herein has been described with reference to particular embodiments, it is to be understood that these embodiments are merely illustrative of the principles and applications of the present invention. For example, the present invention may be incorporated into the wing of an airplane or onto a surface of a machine for controlling vibration of these surfaces. It is therefore to be understood that numerous modifications may be made to the illustrative embodiments and that other arrangements may be devised without departing from the spirit and scope of the present invention as defined by the appended claims.

What is claimed is:

1. A system for controlling vibration of a dynamic surface comprising:
   at least one sensor in communication with said dynamic surface for measuring vibration of said dynamic surface and generating a feedback signal upon measuring vibration;
   at least one piezoelectric actuator in communication with said dynamic surface;
   at least one mass overlying said at least one piezoelectric actuator, wherein said at least one piezoelectric actuator lies between said mass and said dynamic surface;
   a controller in communication with said at least one sensor for receiving the feedback signal, generating an output signal in response to the feedback signal and sending the output signal to said at least one piezoelectric actuator, wherein said piezoelectric actuator applies a counter force between said dynamic surface and said mass upon receiving the output signal for damping or controlling vibration of said dynamic surface.

2. The system as claimed in claim 1, further comprising a roll shell including said dynamic surface.

3. The system as claimed in claim 2, wherein said roll shell has an interior surface and an exterior surface.

4. The system as claimed in claim 3, wherein the exterior surface of said roll shell includes the dynamic surface.

5. The system as claimed in claim 3, wherein the interior surface of said roll shell includes the dynamic surface.

6. The system as claimed in claim 1, wherein said at least one sensor is connected to the dynamic surface.

7. The system as claimed in claim 3, wherein said at least one piezoelectric actuator is connected to the dynamic surface.

8. The system as claimed in claim 3, wherein said at least one sensor is connected to the interior surface of said roll shell.

9. The system as claimed in claim 3, wherein said at least one sensor is connected to the exterior surface of said roll shell.

10. The system as claimed in claim 3, wherein said at least one piezoelectric actuator is connected to the interior surface of said roll shell.

11. The system as claimed in claim 3, wherein said at least one piezoelectric actuator is connected to the exterior surface of said roll shell.

12. The system as claimed in claim 2, wherein said roll shell is rotatable about a central axis.

13. The system as claimed in claim 12, wherein said roll shell has a longitudinal axis substantially parallel to the central axis.

14. The system as claimed in claim 2, wherein said roll shell is substantially cylindrically shaped.

15. The system as claimed in claim 12, further comprising a support member for supporting rotation of said roll shell about said central axis.

16. The system as claimed in claim 15, wherein said support member includes an axle extending in a direction substantially parallel to the longitudinal axis of said roll shell.

17. The system as claimed in claim 15, wherein said roll shell has first and second ends and wherein said roll shell support includes first and second structural members supporting the interior surface of said roll support at the first and second ends thereof.

18. The system as claimed in claim 17, wherein said roll shell support includes bearings located external to said roll shell for engaging said first and second structural members and supporting rotation of said roll shell.

19. The system as claimed in claim 1, further comprising a noncoated roll including said dynamic surface.

20. The system as claimed in claim 1, further comprising a coated roll including said dynamic surface.

21. The system as claimed in claim 13, wherein the counter force applied by said at least one piezoelectric actuator generates a compressive force between the dynamic surface of said roll shell and said mass in a direction substantially perpendicular to the central axis of said roll shell.

22. The system as claimed in claim 13, wherein the counter force applied by said at least one piezoelectric actuator generates a tensile force between the dynamic surface of said roll shell and said mass in a direction substantially perpendicular to the central axis of said roll shell.

23. The system as claimed in claim 13, wherein the counter force applied by said at least one piezoelectric actuator generates compressive and tensile forces between the dynamic surface of said roll shell and said mass in directions substantially perpendicular to the central axis of said roll shell.

24. The system as claimed in claim 13, wherein the counter force applied by said at least one piezoelectric actuator generates compressive and tensile forces between the dynamic surface of said roll shell and said mass in directions substantially non-parallel to the central axis of said roll shell.

25. The system as claimed in claim 1, wherein said at least one sensor measures the velocity, displacement or acceleration of the vibration on said dynamic surface.

26. The system as claimed in claim 25, wherein the counter force applied by said at least one piezoelectric actuator has a magnitude proportional to the magnitude of the feedback signal.

27. The system as claimed in claim 1, wherein said at least one sensor includes a plurality of sensors.

28. The system as claimed in claim 1, wherein said at least one sensor includes a vibration transducer.

29. The system as claimed in claim 1, wherein said at least one piezoelectric actuator includes a plurality of piezoelectric elements.

30. The system as claimed in claim 3, wherein said at least one sensor includes a plurality of sensors and said at least one piezoelectric actuator includes a plurality of piezoelectric elements.

31. The system as claimed in claim 3, wherein said sensors and said piezoelectric actuators are in contact with the interior surface of said roll shell.

32. The system as claimed in claim 31, wherein said at least one mass includes a plurality of masses, each said mass being mounted atop one of said piezoelectric actuators.

33. The system as claimed in claim 30, wherein said sensors and said piezoelectric actuators are in contact with the exterior surface of said roll shell.

34. The system as claimed in claim 32, wherein the ratio of said piezoelectric actuators to said masses are 1:1.

35. The system as claimed in claim 30, wherein said sensors are interspersed between said piezoelectric actuators.

36. The system as claimed in claim 30, wherein the ratio of said piezoelectric actuators to said sensors are approximately 100:1.

37. The system as claimed in claim 1, wherein said at least one piezoelectric actuator has a length of approximately 1–5 cm., a width of approximately 1–5 cm., and a height of less than 1 cm.

38. The system as claimed in claim 1, wherein said at least one piezoelectric actuator covers an area of approximately 1–25 cm$^2$.

39. A system for applying a vibrational force to a dynamic surface comprising:

at least one piezoelectric actuator in communication with said dynamic surface;

at least one mass overlying said at least one piezoelectric actuator, wherein said at least one piezoelectric actuator lies between said at least one mass and said dynamic surface;

a controller in communication with said at least one piezoelectric actuator for transmitting an output signal to said at least one piezoelectric actuator, wherein upon receiving the output signal said at least one piezoelectric actuator is activated for applying a compressive or tensile force between said dynamic surface and said mass.

40. The system as claimed in claim 39, further comprising at least one sensor in communication with said dynamic surface for measuring vibration on said dynamic surface and generating a feedback signal upon sensing vibration.

41. The system as claimed in claim 40, wherein the feedback signal is proportional to the magnitude of the measured vibration.

* * * * *